United States Patent
Anami et al.

(10) Patent No.: US 10,503,604 B2
(45) Date of Patent: Dec. 10, 2019

(54) VIRTUAL MACHINE DATA PROTECTION

(71) Applicant: Hewlett Packard Enterprise Development LP, Houston, TX (US)

(72) Inventors: Veeresh Anami, Bangalore (IN); Mandar Nanivadekar, Bangalore (IN); Venkatesh Marisamy, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 347 days.

(21) Appl. No.: 15/317,250

(22) PCT Filed: May 20, 2015

(86) PCT No.: PCT/US2015/031699
§ 371 (c)(1),
(2) Date: Dec. 8, 2016

(87) PCT Pub. No.: WO2015/199845
PCT Pub. Date: Dec. 30, 2015

(65) Prior Publication Data
US 2017/0116088 A1   Apr. 27, 2017

(30) Foreign Application Priority Data
Jun. 26, 2014 (IN) .......................... 3125/CHE/2014
Jan. 30, 2015 (IN) ............................ 487/CHE/2015

(51) Int. Cl.
*G06F 11/14* (2006.01)
*G06F 16/13* (2019.01)
(Continued)

(52) U.S. Cl.
CPC .......... *G06F 11/1451* (2013.01); *G06F 3/064* (2013.01); *G06F 3/065* (2013.01);
(Continued)

(58) Field of Classification Search
CPC ............ G06F 2201/80; G06F 11/1451; G06F 16/182; G06F 16/188; G06F 16/134;
(Continued)

(56) References Cited

U.S. PATENT DOCUMENTS 7,185,169 B2   2/2007  Biessener et al.
7,613,750 B2   11/2009 Valiyaparambil et al.
(Continued)

FOREIGN PATENT DOCUMENTS

CN    105556478 A   5/2016

OTHER PUBLICATIONS emc.com, "Using EMC VNX Storage With VMware vSphere," TechBook P/N H8229 Rev 05, Version 4.0, Jan. 22, 2013. 238 pages.
(Continued)

*Primary Examiner* — Evan Aspinwall
(74) *Attorney, Agent, or Firm* — Hewlett Packard Enterprise Patent Department (57) ABSTRACT

Virtual machine (VM) data protection includes receiving a data stream comprising data and metadata corresponding to VM data to be backed-up and storing the data at a first location in a storage medium as a thinly distributed file. The thinly distributed file comprises a thin distribution entry between each of a plurality of data blocks to move a pointer from an end of a data block to an offset byte of a next data block. The metadata may be stored at a second location in the storage medium and may be linked to the thinly distributed file.

15 Claims, 7 Drawing Sheets

(51) Int. Cl.
*G06F 16/182* (2019.01)
*G06F 16/188* (2019.01)
*G06F 9/455* (2018.01)
*G06F 3/06* (2006.01)

(52) U.S. Cl.
CPC ............ *G06F 3/067* (2013.01); *G06F 3/0619* (2013.01); *G06F 3/0643* (2013.01); *G06F 9/455* (2013.01); *G06F 9/45558* (2013.01); *G06F 11/14* (2013.01); *G06F 16/134* (2019.01); *G06F 16/182* (2019.01); *G06F 16/188* (2019.01); *G06F 2009/45591* (2013.01); *G06F 2201/80* (2013.01)

(58) Field of Classification Search
CPC ...... G06F 3/0619; G06F 3/064; G06F 3/0643; G06F 3/065; G06F 3/067; G06F 9/455; G06F 9/45558; G06F 11/14; G06F 2009/45591
USPC ......................................................... 707/645
See application file for complete search history.

(56) References Cited

U.S. PATENT DOCUMENTS

| | | | |
|---|---|---|---|
| 7,885,938 B1 | 2/2011 | Greene et al. | |
| 8,046,329 B2 | 10/2011 | Shah et al. | |
| 8,140,906 B1 | 3/2012 | Searls et al. | |
| 8,209,290 B1 | 6/2012 | Dowers, II et al. | |
| 8,307,177 B2 | 11/2012 | Prahlad et al. | |
| 8,458,419 B2 | 6/2013 | Basler et al. | |
| 8,510,271 B1 | 8/2013 | Tsaur et al. | |
| 8,635,187 B2 | 1/2014 | Beatty et al. | |
| 8,666,944 B2 | 3/2014 | Beatty et al. | |
| 8,671,075 B1 * | 3/2014 | Xing | G06F 11/1451 707/640 |
| 8,676,809 B1 * | 3/2014 | Naftel | G06F 11/1448 707/746 |
| 8,719,286 B1 | 5/2014 | Xing et al. | |
| 8,903,777 B1 | 12/2014 | Searls et al. | |
| 8,925,034 B1 | 12/2014 | Tsaur et al. | |
| 9,336,131 B1 | 5/2016 | Sabjan et al. | |
| 9,355,117 B1 | 5/2016 | Brocco et al. | |
| 9,430,332 B1 | 8/2016 | Bahadure | |
| 9,529,806 B1 | 12/2016 | Sumant et al. | |
| 2007/0208918 A1 | 9/2007 | Harbin et al. | |
| 2011/0066819 A1 * | 3/2011 | Mashtizadeh | G06F 3/0617 711/162 |
| 2012/0209812 A1 * | 8/2012 | Bezbaruah | G06F 9/45558 707/646 |
| 2013/0036097 A1 * | 2/2013 | Mutalik | G06F 3/0604 707/690 |
| 2014/0095817 A1 | 4/2014 | Hsu et al. | |

OTHER PUBLICATIONS

International Searching Authority, "Notification of Transmittal of the International Search Report and the Written Opinion", PCT/US2015/031699, dated Aug. 19, 2015 10 pages.

White Paper, "Virtual Server System and Data Protection, Recovery and Availability With CA ARCserve® r16," CA Technologies ARC Serve, Oct. 2011, 16 pages.

Libfuse, "The reference implementation of the Linux FUSE (Filesystem in Userspace) interface", available online at <https://web.archive.org/web/20161003122719/https://github.com/libfuse/libfuse>, Oct. 3, 2016, 5 pages.

Symantec, "Symantec Backup Exec™ System Recovery Granular Restore Option User's Guide", Document Version 8.5, 2008, 19 pages.

VMware Knowledge Base, "Changed Block Tracking (CBT) on virtual machines (1020128)", available online at <https://web.archive.org/web/20131002053805/http://kb.vmware.com/selfservice/microsites/search.do?language=en_US&cmd=displayKC&externalId=1020128>, Oct. 2, 2013, 4 pages.

\* cited by examiner

VIRTUAL MACHINE DATA PROTECTION

BACKGROUND

Computer systems or their components may fail due to various reasons, which may result in the loss of data. In order to mitigate the risk of data loss due to hardware failures, software failures, or any other unforeseen and unavoidable reasons, organizations rely on backup solutions so that data can be recovered in a timely manner to carry on uninterrupted business operations. With increasing use of virtual environments that use virtual machines for hosting different applications and processing data, various solutions are being developed for backup and recovery of virtual machine data to ensure availability of the virtual machines at all times.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Generally, a virtual environment may include multiple virtual machine (VM) host systems, each hosting a number of VMs. The VMs provide applications and services as per their respective configurations. For this, the VMs store and use various types of data including files, applications, and the like. Backup of VM data allows recovery of the data and restoration of a VM to prevent outages, regardless of whether the failure results from corruption, common place errors, or large-scale disasters.

While a VM may be allocated a certain amount of disk space, for example, 100 GB, the VM may be using a fraction of the allocated disk, for example 20 GB, at a given time. As a result, it may not be efficient to backup the complete allocated disk space. Known backup techniques use a changed block tracking (CBT) technique to efficiently use backup disk space. During a backup session, the CBT technique may be used for taking either a full backup of the VM or an incremental backup. For the full backup, those blocks in the VM that have data in them are provided to the backup system for storage and empty blocks are not provided. For the incremental backup, those blocks in the VM in which data has changed since the last backup, either full or incremental, are provided to the backup system for storage, and other blocks are not provided even if they have data in them since that data would not have changed over the last backup. Accordingly, the CBT based backup system stores data from various backup sessions as either full or incremental backed-up data.

Increasingly, techniques are being developed to provide for granular recovery of data, whereby the user is allowed to select files for recovery from the backed-up data instead of recovering the complete VM data. For granular recovery of data from a selected backup session, the layout of files on the VM disk corresponding to that backup session is first presented to a user from a mount of a disk image of the VM disk so that the user can select particular files to be recovered. A layout of files can be understood as a representation of the file system on the VM disk, for example, in form of the directory structure, and indicating the size of each of the files on the VM disk.

In case of CBT based full and incremental backups, as the backup disk does not correspond to the disk image of the VM disk, but corresponds to the changed block data, the VM disk is to be restored from the backup disk before it can be mounted and made available to a user for browsing contents of the VM disk. In addition, in case a file is to be recovered from an incremental backup, the changed block data has to be also merged with previous incremental backups up to the last full backup to be able to recover the file. Hence, the backup disk is generally staged, i.e., the VM disk is restored on a temporary disk space and then mounted from the temporary disk space. Since the VM disk may correspond to several hundred GB or even terabytes of disk space, a large amount of temporary disk space may have to be kept available to be able to restore it and perform granular data recovery. The restoration of the VM disk on the temporary disk space also places a performance penalty on the backup system as the restoration to the temporary location involves a number of input/output (I/O) requests, which can be time and resource consuming. Further the time and resources consumed increases with the size of the VM disk to be restored and is hence inefficient.

The present subject matter relates to systems and methods for backup and recovery of virtual machine data and, in particular, for creating backups based on changed block tracking (CBT) and performing non-staged granular recovery of data from such backups. The described methods and systems also allow storage of CBT based backed-up data in a format such that granular recovery of data can be performed without staging. Further, the described methods and systems also allow for restoration of the VM disk in case, for example, the complete VM disk is to be restored.

The described systems and methods may be implemented in various computing devices which either provide virtual environments, or are connected to computing devices providing virtual environments, through one or more networks. For the sake of explanation, computing devices which utilize virtualization agents or hypervisors to provide virtual environments including one or more VMs may be referred to as VM hosts. Further, computing devices providing capability for CBT based backup and non-staged granular recovery of data may be referred to as Data Protection (DP) systems.

In an example implementation of the present subject matter, a VM host may utilize a hypervisor to provide the VMs. The hypervisor may allow CBT based backup of VM data and, as a result, either full or incremental backup of the VMs may be taken based on the backup policies and/or user selection. For the purpose of full or incremental CBT based backup in a backup session, the hypervisor may provide a CBT map to the DP system before sending the data for backup. The CBT map can include information about the offset byte at which the data for a particular data block to be stored starts and the byte size of the data in that particular data block. Data blocks are interchangeably referred to as blocks hereinafter. The blocks could be of variable size and there may also be overlaps between blocks in different incremental or full backups.

The DP system can process the CBT map to determine block sizes and offset bytes at which data is to be written. Further, the DP system can store the CBT map, for example, as a CBT map file, in a DP database for reference in case data recovery is to be performed. The DP system then receives the data and metadata corresponding to the data as a data stream for being backed-up. The metadata can be understood as data representing information about the data being backed-up. The metadata may be utilized for various purposes, such as to provide catalog of backed-up data and to provide housekeeping functions. In one implementation, the metadata and the data are written separately on a storage device and a link is created between the metadata and the data so that non-staged granular recovery may be performed.

To ensure that the size of the backed-up data that is written is similar to the size of the data received for backup, but at the same time corresponds to the VM disk image, thin distribution entries may be written between the data blocks. A thin distribution entry written after a block can be understood as an entry that consumes negligible, almost zero, disk space but causes a pointer to move to the offset byte at which the next block starts. For example, the thin distribution entry may correspond to a performseek operation or other application programming interface (API) calls. The backup disk thus created using thinly distributed files corresponds to the VM disk image and can be used for non-staged granular data recovery and/or data restoration. A request for non-staged granular data recovery or data restoration may be received as requests for reading data from a thinly distributed file.

For example, in case a request for granular recovery of data from a backup session is received, the DP system may create a temporary shared directory, based on the metadata and a context file of the backup session, for providing access to the VM data of that backup session for being browsed. For example, the disk descriptor files and the thinly distributed files of that backup session, and related backup sessions in case of an incremental backup session, may be used to mount the thinly distributed file and allow a user to browse the layout of files to select data for granular recovery. The data can be then fetched by the DP system from the storage device based on the CBT maps, the metadata, and the context file, and can be provided to the user.

Since the temporary shared directory is used for mounting the thinly distributed files and not for restoration of the complete backed-up data, the temporary disk space used is substantially reduced as compared to that consumed for staging and restoration of the VM disk. For example, on mounting, the temporary shared directory may contain file name entries and links to the files or metadata of files in the backed-up data, which may consume little disk space. The user can remotely browse the mounted thinly distributed files from the shared directory and can select data for granular recovery.

Further, in case of granular recovery of data from an incremental backup session, the DP system may gather bytes corresponding to the requested data from thinly distributed files of the incremental backup session and preceding backup sessions. The preceding backup sessions include previous incremental backup sessions up to a last full backup session and the last full backup session. The gathered bytes may be then provided as a recovered file without actually merging the incremental and the preceding backup sessions.

Thus, non-staged granular recovery and/or restoration of data may be performed for CBT based data backups using thinly distributed files. Further, on the fly consolidation of data bytes can be done without merging backed-up VM data. This can substantially reduce the amount of disk space and processing time and resources used otherwise for data recovery or restoration.

The above mentioned systems and methods are further described with reference to figures. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and examples thereof, are intended to encompass equivalents thereof.

Figure 1A:
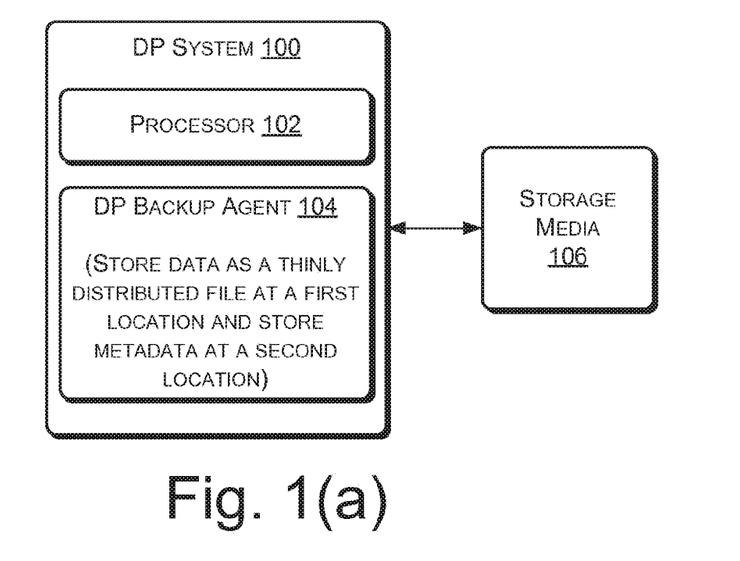
FIG. 1(a) illustrates an example data protection system for virtual machine data protection, according to an example of the present subject matter.

FIG. 1(a) illustrates an example data protection system for backup and recovery of virtual machine data, according to an example of the present subject matter.

As illustrated, a data protection (DP) system 100 includes processor(s) 102 and a DP backup agent 104. The DP system 100 may be implemented as any of a variety of computing systems, such as a desktop computer, a laptop computer, a server, a tablet, and the like.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions stored in a memory. The functions of the processor 102 may be provided through the use of dedicated hardware as well as hardware capable of executing machine readable instructions.

The DP backup agent 104 may be coupled to and/or be executable by the processor(s) 102, and may include, amongst other things, routines, programs, objects, components, data structures, and the like, which perform particular tasks or implement particular abstract data types.

In operation, the DP backup agent 104 may receive a data stream from a VM host (not shown in this figure). The data stream may include data and metadata corresponding to the VM data on a VM disk to be backed-up. The DP backup agent 104 may store the data at a first location in a storage media 106. The storage media 106 may include various media, such as backup disks, tape drives, etc., used for storing backup copies of data. In one example, the storage media 106 can be a collection of multiple storage mediums. Further, the DP system 100 may communicate with the storage media 106 either directly or over a communication network, as will be discussed later.

The VM data may be stored in the storage media 106 as a thinly distributed file having a plurality of data blocks. The thinly distributed file may be created based on a CBT map corresponding to the VM data. The thinly distributed file can include a thin distribution entry between each of the plurality of data blocks to move a pointer from an end of a data block to an offset byte of a next data block. As the thin distribution entry by itself consumes negligible disk space, the thinly distributed file thus created is similar in size to the VM data on the VM disk in case of a full CBT backup, but corresponds to the VM disk image directly and does not have to be staged. In case of an incremental CBT backup, the thinly distributed file is similar in size to the VM data that changed after a previous backup of the VM disk, and can be used to mount the VM disk image without staging, when read along with the thinly distributed files of preceding backup sessions, as will be explained later.

Figure 1B:
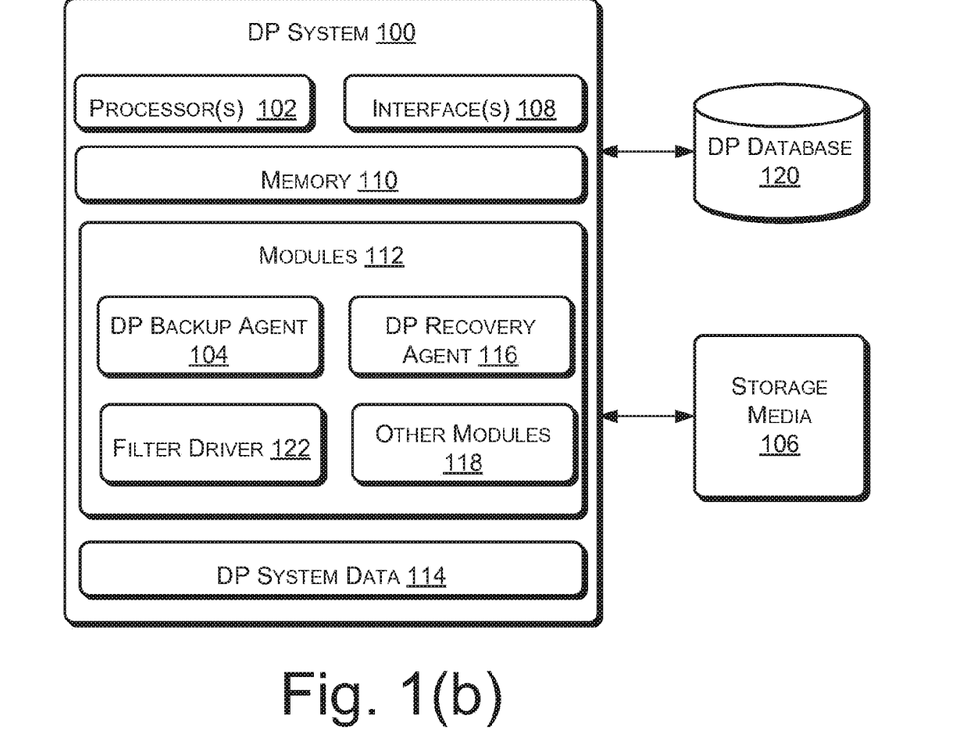
FIG. 1(b) illustrates in detail an example data protection system for backup and recovery of virtual machine data, according to an example of the present subject matter.

Further, the DP backup agent 104 may store the metadata at a second location in the storage medium, the second location being different from the first location. For example, the metadata may include, but is not limited to, descriptors, references, file sizes, disk information, checksum information, and time of backup of the data. The thinly distributed file at the first location may be linked with the metadata at the second location to allow recovery of the VM data. Recovery of the VM data, as used herein, can also refer to restoration of the VM data, for example, when the complete VM data is to be recovered or copied from the storage media 106. An example detailed implementation of the DP system 100 is provided with reference to FIG. 1 (*b*).

FIG. 1(*b*) illustrates in detail an example DP system 100 for backup and recovery of virtual machine data, according to an example of the present subject matter. As illustrated, in addition to the processor(s) 102 and the DP backup agent 104, the DP system 100 may include interfaces 108, memory 110, modules 112, and DP system data 114.

The interfaces 108 may include a variety of machine readable instructions-based interfaces and hardware interfaces that allow interaction with other communication and computing devices, such as network entities, web servers, and external repositories, and peripheral devices. The memory 110 may include any non-transitory computer-readable medium including, for example, volatile memory (e.g., RAM), and/or non-volatile memory (e.g., EPROM, flash memory, Memristor, etc.). The memory 110 may also be an external memory unit, such as a flash drive, a compact disk drive, an external hard disk drive, or the like. The modules 112 may be coupled to or be executable by the processor(s) 102, and may include, amongst other things, routines, programs, objects, components, data structures, and the like, which perform particular tasks or implement particular abstract data types. The DP system data 114 may serve as a repository for storing data that may be fetched, processed, received, or created by the module(s) 112 or received from connected computing systems and storage devices.

Further, the modules 112 can include the DP backup agent 104, a DP recovery agent 116, and other modules 118. The other modules 118 may include programs or coded instructions that supplement applications and functions, for example, programs in the operating system, of the computing DP system 100.

In operation, in a backup session, for taking a CBT based backup of VM data present on a VM disk, the DP backup agent 104 receives and processes a CBT map corresponding to the VM data to determine the block sizes and offset bytes of the data blocks that include the VM data to be backed-up. Further, the DP backup agent 104 can store the CBT map in a DP database 120. The DP backup agent 104 also stores backup session related information, such which VM is being backed up, target storage location, amount of used/free space, etc., in the DP database 120, for example, as a context file, along with the CBT map.

The DP database 120 may communicate with the DP system 100 either directly or over a communication network. In some implementations, the DP database 120 may be partially or fully implemented in the DP system 100. The DP database 120 may be implemented as any of a variety of database types, such as a relational database, a hierarchical database, a distributed database, and the like.

Further, after the CBT map is processed by the DP backup agent 104, the DP system 100 may receive data and metadata corresponding to the VM data to be backed-up as a data stream. In one example, the data stream may contain data in chunks varying from, for example, 1 MB to 8 MB. As the data stream is received, the DP backup agent 104 may store the data in a first location in the storage media 106. The data may be stored in the form of blocks in a thinly distributed file as per the CBT map by writing data starting from the offset byte of the first block. Once the first block gets filled, the data is written in the second block, i.e., starting from the offset byte of the second block and so on. For example, if an incoming data chunk is 1 MB but the first block is of byte size 300 KB, then first 300 KB of the data will be written in the first block and the remaining 700 KB data will be written in the next block as per the CBT map, and so on, until the incoming data buffer is empty. In another example, if the incoming data chunk is 1 MB and the first block is of 4 MB, the incoming data chunk will be written in the first block and the next incoming data chunk will also be written starting from where the previous chunk of data finished and so on, until the first block is full. The data writing process will then move to the next block as per the CBT map. Further, thin distribution entries, which consume negligible bytes, may be written between each of the data blocks to move a pointer from an end of one data block to an offset byte of the next data block.

The thinly distributed file thus created corresponds to a binary disk image of the VM disk being backed-up and is interchangeably referred to as disk image file or binary image file herein. For example, in case of a full backup, the thinly distributed file may directly correspond to the VM disk image, and in case of an incremental backup, the thinly distributed file may correspond to the VM disk image when read along with thinly distributed files of preceding backup sessions. In one example, the DP backup agent 104 may include a data storage component and a writer component (not shown) to receive the data and metadata, and create the thinly distributed file for the received data. The manner of creation of thinly distributed files is discussed in more detail later with reference to FIG. 2, which represents the logic that is applied for each received chunk of data while creating thinly distributed files.

Further, the DP backup agent 104 may store the metadata at a second location different from the first location of the thinly distributed file and may link the metadata to the thinly distributed file to allow non-staged recovery of data, such as files, file system information, and the like, from the thinly distributed file. The metadata in the data stream may include, but is not limited to, disk descriptors, references, file sizes, disk information, and time of backup of the data. In one example, the DP backup agent 104 may create a context file based on the metadata and store the context file in the DP database 120. The thinly distributed file, the metadata, and the context file can be used for granular recovery of data without performance or space penalty on the backup and recovery process.

In one implementation, the DP recovery agent 116 can be coupled to the processor to perform non-staged granular recovery of data from the thinly distributed files. In operation, the DP recovery agent 116 may receive a request from a user for browsing the layout of files, also referred to as file layout, in a backup session for selecting data, such as a file, for granular recovery. The DP recovery agent 116 may create a temporary shared directory to provide access to the thinly distributed file from a mount point for browsing, based on the metadata and the context file, as will be discussed later in detail.

The user may then browse the file layout of the VM data from the thinly distributed file and select data for recovery. The selection of the data for recovery may be received as a read request for the data by the DP recovery agent 116. The DP recovery agent 116 can determine a byte range corresponding to the data based on the metadata, the context file, and the CBT map of the thinly distributed file. The DP recovery agent 116 can then retrieve the bytes corresponding to the determined byte range and can provide the retrieved bytes as the data.

In one example, in case data is to be recovered from a full backup session, the thinly distributed file of the full backup session includes the complete VM data with thin distribution entries corresponding to empty data blocks. Thus, the thinly distributed file corresponds to a binary image file or disk image of the VM disk. The DP recovery agent 116 can provide access to the thinly distributed file of a full backup session for mounting and being browsed by the user through a shared directory, for example, using Common Internet File System (CIFS) or Network File System (NFS). The disk descriptor file and the thinly distributed file for that session can be directly mounted to present a layout of the backed-up VM disk for that session.

The user can browse the layout of files from the thinly distributed file and can select data to be read. For example, the selection of a file can correspond to selection of a link to metadata of the file that is in turn linked to the data and specifies the byte range of the data to be fetched. The data corresponding to the selected files can be then fetched by the DP recovery agent 116 from the storage media 106 based on the metadata and the linked data, and can be provided to the user. Thus, while the storage media 106 may store CBT based data for efficient storage, it may be possible to mount the thinly distributed file directly using the metadata and the context file without staging or restoration of the VM disk. Further, the thinly distributed file can also be used for restoration of the VM disk, if requested by a user, by reading and copying the complete data from the thinly distributed file.

In another example, in case the backup session from which the data is to be recovered is an incremental backup session, the DP recovery agent 116 may gather the bytes, corresponding to the determined byte range, from the data blocks in thinly distributed files of the incremental backup session, previous incremental backup sessions up to a last full backup session, and the last full backup session, based on corresponding CBT maps.

In operation, in case of granular recovery from an incremental backup session, the associated thinly distributed file includes VM data that changed after the last backup, where the last backup itself may have been an incremental or a full backup. Hence, to provide data corresponding to an incremental backup session, the data in the previous backups up to and including the last full backup may have to be gathered. For example, to recover a file from an Incremental 2 backup session, the byte ranges corresponding to the file in Incremental 1 and Full backup session may have to be gathered. In one example, the context file of an incremental backup session can include information, such as which previous backup sessions are related and have to be consolidated with this backup session, which are the disk descriptors for each of those backup sessions, etc.

When the user requests for a particular incremental backup session, such as Incremental 2, to be mounted the DP recovery agent 116 can create a temporary shared directory, for example, using Common Internet File System (CIFS) or Network File System (NFS), to make the disk descriptor and binary image/thinly distributed files for the incremental and related or preceding backup sessions available for mounting, based on the context file and/or session versioning information stored in the DP database 120. The thinly distributed files can be then mounted based on the disk descriptor files so that it appears as a physical disk from which the file systems or layout of files can be browsed. Since the temporary shared directory is used for mounting the thinly distributed files and not restoration of the complete backed-up data, the temporary disk space used is substantially reduced as compared to that consumed for staging and restoration of the VM disk. For example, on mounting, the temporary shared directory may contain file name entries and links to the files or metadata of files in the backed-up data, which may consume little disk space. The user can remotely browse the mounted thinly distributed files from the shared directory and can select files or data for granular recovery.

In one implementation, the request for mounting an incremental backup session and subsequent selection of files may be received as a read request by the DP system 100. Since the DP system 100 may be receiving requests from a plurality of users or VM hosts, in one implementation, the DP recovery agent 116 can initiate a filter driver 122 to listen to the read requests. In case a read request does not relate to an incremental backup session, the request is processed normally by the DP system 100. If, however, the request relates to mounting of an incremental backup session or recovery of a file from the mounted incremental backup session, the filter driver 122 provides the request to the DP recovery agent 116 with an indication that it relates to an incremental backup session. The DP recovery agent 116 can then determine, from the metadata, context file, and CBT based data, the thinly distributed files that are to be used for performing the read request.

In one example, the DP recovery agent 116 receives a notification through the filter driver 122 that a read request for a certain offset and size of bytes related to a file in an incremental backup session is received. Based on this, the DP recovery agent 116 can determine which partial or full blocks in the incremental and related backup sessions this byte range corresponds to. The blocks can be determined based on the context file, the CBT map for the incremental backup session and related backup sessions, etc. The DP recovery agent 116 can then directly fetch the bytes from those blocks and provide them to the VM host instead of performing a merge operation. Thus, without actually merging data blocks of multiple backup sessions, the DP system 100 can create the file while performing the recovery to allow efficient granular recovery of data.

Figure 1C:
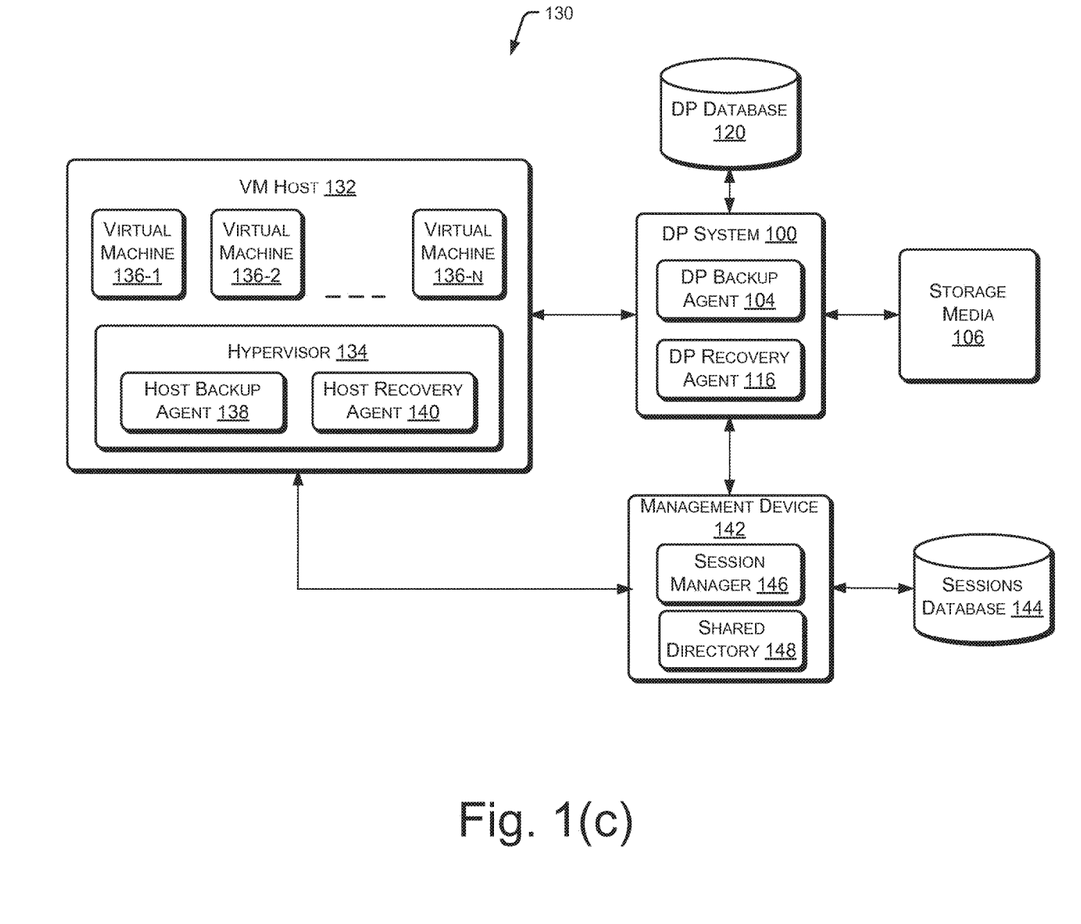
FIG. 1(c) illustrates a computing environment implementing a data protection system for backup and recovery of virtual machine data, according to an example of the present subject matter.

FIG. 1(c) illustrates an example computing environment 130 implementing a DP system 100 for backup and recovery of virtual machine data, according to an example of the present subject matter.

The computing environment 130 may include a VM host 132 in communication with a DP system 100. While a single VM host 132 and a single DP system 100 are illustrated for discussion purposes, it will be appreciated that there could be multiple VM hosts and multiple DP systems in the computing environment 130. The VM host 132 may utilize a hypervisor 134 to create a virtual environment. The VM host 132 may accordingly support one or more virtual machines VM 136-1, VM 136-2 . . . VM 136-n in the virtual environment. The virtual machines may individually be referred to as a VM 136.

A VM 136 of the virtual environment can be understood as a virtual emulation of the VM host 132, capable of providing functionalities based on a predefined configuration by commonly utilizing the hardware capabilities of the VM host 132. The computing capabilities of the VM 136 may either be equal to that of the VM host 132, or may be a sub set of the computing capabilities of VM host 132 and may be preconfigured depending on the functionalities of the VM 136. Therefore, the VMs 136-1 to 136-n may have different capabilities and may accordingly support different applications and use different files.

For example, the VM 136-1 may provide web hosting services while the VM 136-2 may provide capabilities of big data analysis and storage. Accordingly, the VM 136-1 may include applications, such as Apache™, to support the functionality of web hosting, and the VM 136-2 may include applications, such as Hadoop®, to support big data analysis.

Accordingly, each VM 136 may be associated with a VM disk (not shown), which may actually be a part of the disk space of the VM host 132 but may function as an independent disk for the respective VM 136. The VM 136 may thereby store and execute applications, and store files and other data on its VM disk and use a separate operating system running on the VM disk.

The VM host 132 and the DP system 100 can also communicate with a management device 142, which can coordinate backup and recovery of data between the VM host 132 and the DP system 100. In one implementation, when there are multiple VM hosts and DP systems in the computing environment 130, the management device 142 may act as a server that manages the VM data protection, including VM data backup and recovery, for the multiple VM hosts and the DP systems may act as clients to the management device 142.

While not illustrated in the present figure, it will be understood that the VM host 132 and the management device 142, like the DP system 100, will include various hardware, firmware, or software components, such as processors, memory, modules, data, interfaces, etc., for their functioning, and may be implemented through various computing systems, such as desktop computers, servers, laptops, and the like.

For example, the processors may be implemented as microprocessors, microcomputers, microcontrollers, digital signal processors, central processing units, state machines, logic circuitries, and/or any devices that manipulate signals based on operational instructions. Among other capabilities, the processor may fetch and execute computer-readable instructions stored in a memory. The functions of processors may be provided through the use of dedicated hardware as well as hardware capable of executing machine readable instructions. The interfaces may include a variety of machine readable instructions-based interfaces and hardware interfaces that allow interaction with other communication and computing devices, such as network entities, web servers and external repositories, and peripheral devices.

The memory may include any non-transitory computer-readable medium including, for example, volatile memory (e.g., RAM), and/or non-volatile memory (e.g., EPROM, flash memory, Memristor, etc.). The modules may be coupled to be or executable by the processor(s), and may include, amongst other things, routines, programs, objects, components, data structures, and the like, which perform particular tasks or implement particular abstract data types. The data may serve as a repository, or a backup storage media for storing data that may be fetched, processed, received, or created by the module(s) or received from connected computing systems.

The communication environment 130 also includes the storage media 106 and the DP database 120 in communication with the DP system 100, and a sessions database 144 in communication with the management device 142. Further, the VM host 132, the DP system 100, and the management device 142 may communicate with each other either directly or over one or more communication networks (not shown). Similarly, the DP system 100 may communicate with the DP database 120 and the storage media 106 either directly or over one or more communication networks, and the management device 142 may communicate with the sessions database 144 either directly or over one or more communication networks.

If used, the communication networks may be a wireless network, a wired network, or a combination thereof. The communication networks can also be an individual network or a collection of many such individual networks, interconnected with each other and functioning as a single large network, e.g., the Internet or an intranet, and can be implemented as any of the different types of networks, such as intranet, local area network (LAN), wide area network (WAN), and such. The communication networks may also include individual networks, such as but not limited to, Global System for Communication (GSM) network, Universal Telecommunications System (UMTS) network. Long Term Evolution (LTE) network, etc.

The DP database 120 and the sessions database 144 may be implemented as any of different types of databases, such as relational databases, hierarchical databases, network databases, etc.

Based on backup policies of an organization implementing the computing environment 130, the hypervisor 134 may trigger backup of the VM disk of a VM 136, for example, at pre-scheduled times or when a particular event, such as application update, occurs. Further, the hypervisor 134 may assist in granular recovery of data of the VM 136 from the backed-up data. For this, in one example, the hypervisor 134 may include a host backup agent 138 and a host recovery agent 140 that can work in association with the DP system 100 and the management device 142.

In one example, for implementing the backup and recovery of virtual machine data, the DP system 100 can include the DP backup agent 104 and the DP recovery agent 116. Further, the management device 142 may include a session manager 146 to coordinate the backup and recovery of virtual machine data.

In one implementation, the host backup agent 138 can implement changed block tracking (CBT) based backup, whereby, when a backup session is initiated for a VM 136, the host backup agent 138 sends the data of particular blocks in the VM disk for backup to the DP backup agent 104. For this, the host backup agent 138 may obtain the CBT information from a client agent (not shown) on the VM 136.

The CBT based backup of a VM disk can be either a full backup or an incremental backup. In one implementation, when a backup session is initiated, for example, based on data backup policies or on user request, it is also specified whether a full backup is to be done or an incremental backup is to be done. A full CBT backup refers to backing up all those data blocks on the VM disk that contain data and leaving out empty data blocks, while an incremental CBT backup refers to backing up of those data blocks in which data has changed since the last backup session and leaving out both empty data blocks and data blocks in which data has not changed. In one example, the size of data blocks to be sent for backup can vary in a backup session and between successive backup sessions, depending on the file management system used by and operation of the VM 136.

Once a CBT based backup is initiated, a CBT map is sent by the host backup agent 138 to the DP backup agent 104. The CBT map can be, for example, a table that specifies an offset byte from where each block starts and size of data, or byte size, in each such block as shown in Table 1 below.

TABLE 1

Example CBT map

| Offset | Size |
|---|---|
| 0 | 65536 |
| 33619968 | 262144 |
| 42139648 | 25952256 |
| 135004160 | 2883584 |
| 206897152 | 6946816 |
| 278855680 | 12320768 |
| 364969984 | 7405568 |
| 373293056 | 131072 |
| 373620736 | 1179648 |
| 379584512 | 327680 |
| 462290944 | 524288 |
| 509411328 | 5701632 |
| 581304320 | 1900544 |
| 653197312 | 9633792 |
| 725090304 | 6029312 |
| 796983296 | 6094848 |
| 868876288 | 10027008 |
| 940760280 | 5242880 |
| 1019215872 | 393216 |
| 1071644672 | 65536 |
| 107164467200 | 65536 |

In one example, if the table 1 corresponds to a full backup CBT map, the first block may start at an offset of zero and may have 65536 bytes of data, but the second block may start at an offset of 33619968 bytes. This would mean that the bytes between 65536 bytes and 33619968 bytes would be empty and not contain any data. Similarly, as can be seen from table 1, there may be large empty spaces between successive blocks of data in case of a full backup.

In another example, if table 1 corresponds to an incremental backup CBT map, it would denote that bytes starting from offset of 0 to 65536 have been changed and then bytes starting at an offset of 33619968 bytes have been changed. It may, however, not mean that the intervening bytes are empty because they may either be empty or data therein may not have changed after the previous backup.

The DP backup agent 104 receives and processes the CBT map to determine the block sizes and offsets of data to be stored in a thinly distributed file in a storage medium from amongst the connected storage media 106. Further, the DP backup agent 104 can store the CBT map in the DP database 120. The DP backup agent 104 also stores backup session related information, such which VM 136 is being backed up, target storage location, amount of used/free space, etc., in the DP database 120 with the CBT map.

Figure 3A:
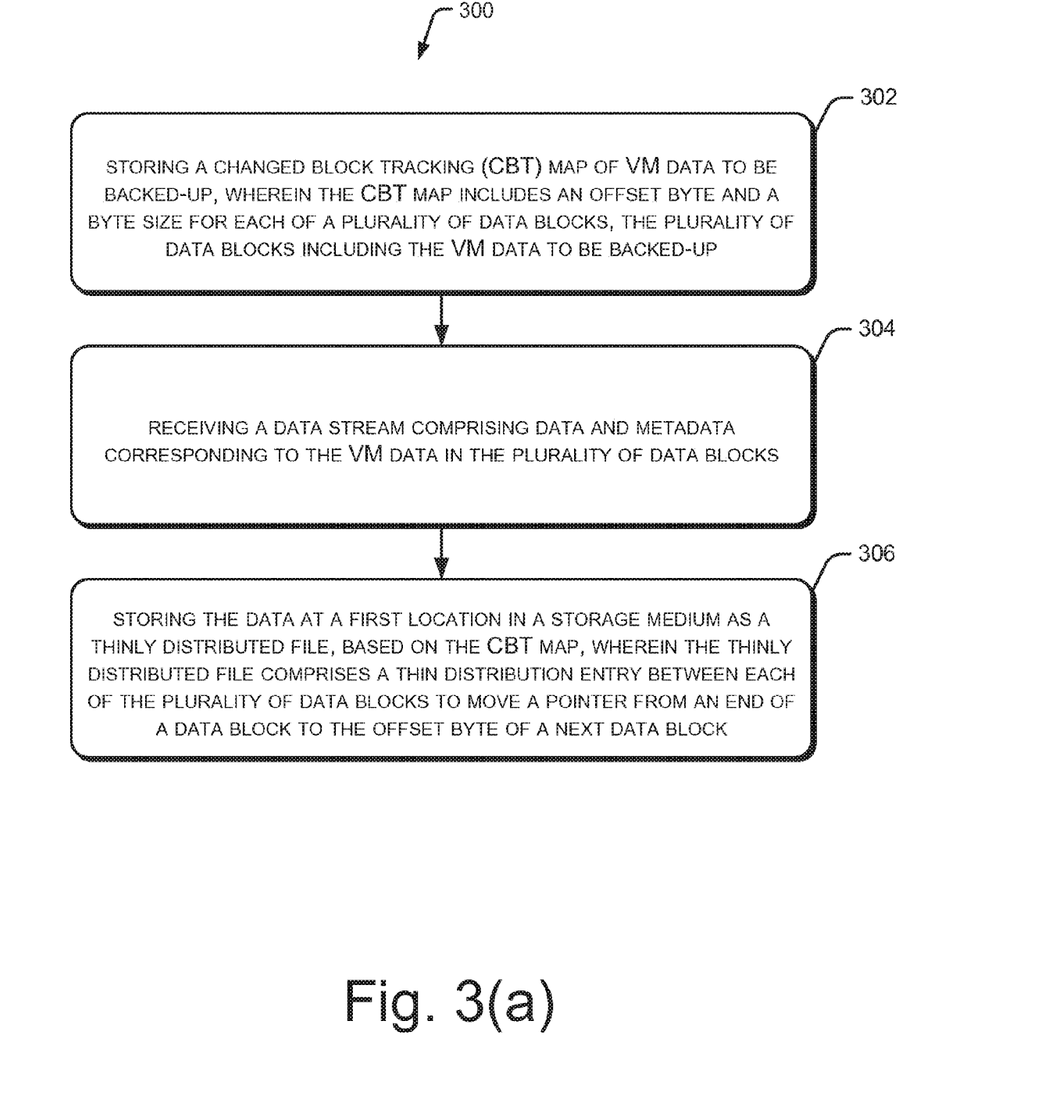
FIG. 3(a) illustrates an example method for taking a backup of virtual machine data for non-staged granular recovery, according to an example of the present subject matter.

The host backup agent 138 then sends a data stream containing the data for backup and metadata corresponding to the data. The metadata in the data stream may include, but is not limited to, disk descriptors, references, file sizes, disk information, and time of backup of the data. The DP backup agent 104 receives the data stream and writes the data and metadata separately on the storage medium. Further, links are created between the metadata and the data so that non-staged granular recovery may be performed, as discussed later with reference to one example method with illustrated in FIG. 3(*a*). Also, in one example, the session manager 146 creates a context file for each backup session including the metadata and context information, for example, details about type of backup session, whether full or incremental, which are the related disk descriptor files, etc., and stores the context file in the sessions database 144. In another example, the context information may be created by the DP system 100 and stored in the DP database 120.

In one example, the data stream may contain the actual data in chunks varying from, for example, 1 MB to 8 MB. As the data stream is received, the DP backup agent 104 stores the data in blocks, based on the CBT map, as a thinly distributed file by writing data starting from the offset of the first block. Once the first block gets filled, the data is written in the second block starting from the offset of the second block and so on. Further, the DP backup agent 104 writes thin distribution entries between the filled blocks to cause a pointer to move to the offset byte at which the next block starts. The thinly distributed file thus created can be used for granular recovery of data.

In one implementation, a user can, through a user interface, initiate the host recovery agent 140 to perform a granular recovery of a file of the VM 136. In another implementation, the session manager 146 may provide the user interface to perform a granular recovery of a file of the VM 136. For illustration, the description is provided with reference to the granular recovery being performed using the host recovery agent 140.

The user may also select a backup session from which the granular recovery or restoration is to be performed. The selected backup session can be a full backup session or a combination of a full and one or more incremental backup sessions. The selection of a backup session may also be received as a read request for the file system in the thinly distributed file. Accordingly, the host recovery agent 140 may send a request to the DP recovery agent 116 and the session manager 146 for mounting the disk descriptors and thinly distributed files corresponding to the selected backup sessions to allow the user to browse their file system or layout of files.

In one example, when the user selects a full backup session for granular recovery, the thinly distributed file is made accessible to the host recovery agent 140, for example, through a CIFS/NFS shared directory. The shared directory may be created in the DP system 100 (not shown) or in the management device 142, for example, as shared directory 148, or any other connected computing system. The host recovery agent 140 can use hypervisor application programming interfaces (APIs) to mount the disk descriptor and the thinly distributed file, and thus make the backed-up VM disk available for the user to select one or more files. Once the backed-up VM disk is mounted, it appears as a mount point, such as a disk drive, and can be browsed. The host recovery agent 140 agent then shows the list of files, which were backed-up, from the mount point. Once the user selects data, such as one or more files, for recovery, the DP recovery agent 116 can fetch bytes corresponding to the data from the storage media 106, based on the metadata, the context file, and the CBT map of the thinly distribute file, and provide it to the host recovery agent 140 to complete the granular recovery.

In another example, consider a case where a user selects an incremental backup session INC2, which is dependent on another incremental backup session INC1 and a full backup session F0 due to the use of CBT based backup, for data recovery. In one implementation, the user can select the session INC2 for granular recovery and the host recovery agent 140 sends information about the INC2 session from which granular recovery is to be done to the DP recovery agent 116 and the session manager 146. Based on the context file of the INC2 session, the session manager 146 can determine that it is related to preceding backups INC1 and F0, and can provide the information to the DP recovery agent 116. In another implementation, the user can select the session INC2 and the preceding sessions INC1 and F0 for granular recovery, and the host recovery agent 140 sends information about the selected sessions to the DP recovery agent 116 and the session manager 146.

The DP recovery agent 116 creates the shared directory 148, for example, using a CIFS/NFS share to mount disk descriptor and binary image file of VM disk corresponding to the selected sessions INC2, INC1, and F0. In one example, separate shared directories or paths may be created for accessing the thinly distributed files of the different sessions. While the shared directory is shown as being created on the management device 142, it will be understood that the DP recovery agent 116 can create the file directory on any remote device accessible by the VM host 132. In one example, the disk descriptors of VM disk corresponding to the selected sessions INC2, INC1, and F0 are retrieved as a context file by the session manager 146 from the sessions database 144 and provided to the DP recovery agent 116 for mounting through the shared directory 148.

In one implementation, the DP recovery agent 116 may initiate a hook/file system filter driver, such as the filter driver 122, to listen to read requests received from the VM host 132. If the read request for a file does not relate to an incremental backup session, the read request is processed normally. If however, the request corresponds to an incremental backup session, the filter driver passes control to the DP recovery agent 116 with an indication that it corresponds to an incremental backup session. The DP recovery agent 116 then accesses the context file, CBT maps, and metadata of the incremental backup session and related full and incremental sessions, maps the read request to correct set of blocks (from full/incr1/incr2 sessions) and returns the requested bytes of data for granular recovery.

For example, the host recovery agent 140 may ask for byte range 67788 to 89909 corresponding to a file or other data selected by the user. This byte range may belong to two different blocks and may include data from two different thinly distributed files. For example, 67788 to 70000 may have to be recovered from thinly distributed file created in F0 backup and 70001 to 89908 may have to be recovered from thinly distributed file created in INC2 backup. Then both these thinly distributed files have to be referred. For this, the DP recovery agent 116 picks up the corresponding data byte ranges from the thinly distributed files directly without performing an actual merge operation on the storage media. Thus the DP system 100 can simulate recovered data, which is a combination of newest blocks on the incremental stored images and older blocks from earlier full/incremental images which were not modified and hence not written to the latest incremental images.

Figure 1D:
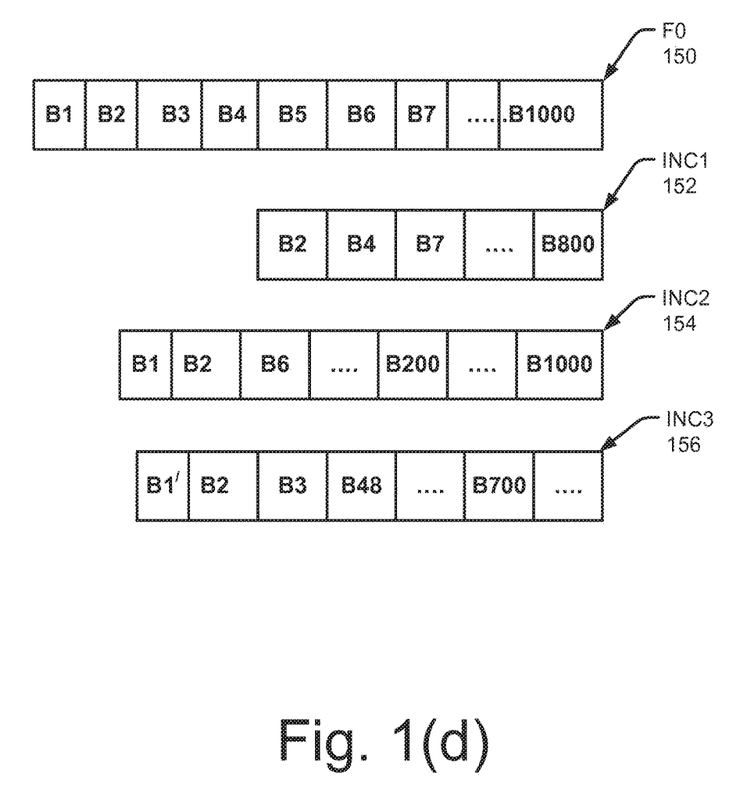
FIG. 1(d) illustrates example thinly distributed files used for changed block tracking based virtual machine data backup and recovery, according to an example of the present subject matter.

For example, FIG. 1(d) illustrates example thinly distributed files used for backup and recovery, according to an example of the present subject matter. As shown in FIG. 1(d), in the full or F0 backup blocks B1, B2, . . . B1000 may be stored as a thinly distributed file F0 150 with thin distribution entries between the blocks to enable an offset to be created between the blocks based on the CBT map. In the first incremental. INC1 backup after the F0 backup, blocks B2, B4, B7, etc., are saved in the thinly distributed file INC1 152 as these blocks may have changed after the F0 backup. Further, in the second incremental backup INC2, the blocks B1, B2, B6 etc., are saved in the thinly distributed file INC2 154 as these blocks may have changed after the INC1 backup. Thus, to gather bytes for a recovered file having blocks B1, B2, B3, B4, and B5, the DP recovery agent 116 may fetch data for B1 and B2 from INC2 154, B4 from INC1 152, and B3 and B5 from F0 150, and can send this fetched data to the host recovery agent 140.

In one example, if the VM is fragmented then subsequent incremental images may have overlapping blocks with earlier full/incremental blocks. So INC3 156 backup file may have partial byte range for B1 as compared to INC2 154 file. For example, if B1 is of 65536 bytes and was fully modified in INC2 backup, in INC3 backup the first 32655 bytes could be modified, shown as B1'. For granular recovery of file based on INC3 backup including bytes in block B1, the DP recovery agent 116 can fetch first 32655 bytes from INC3 file 156 and remaining 32881 bytes from the INC2 file 154.

Figure 2:
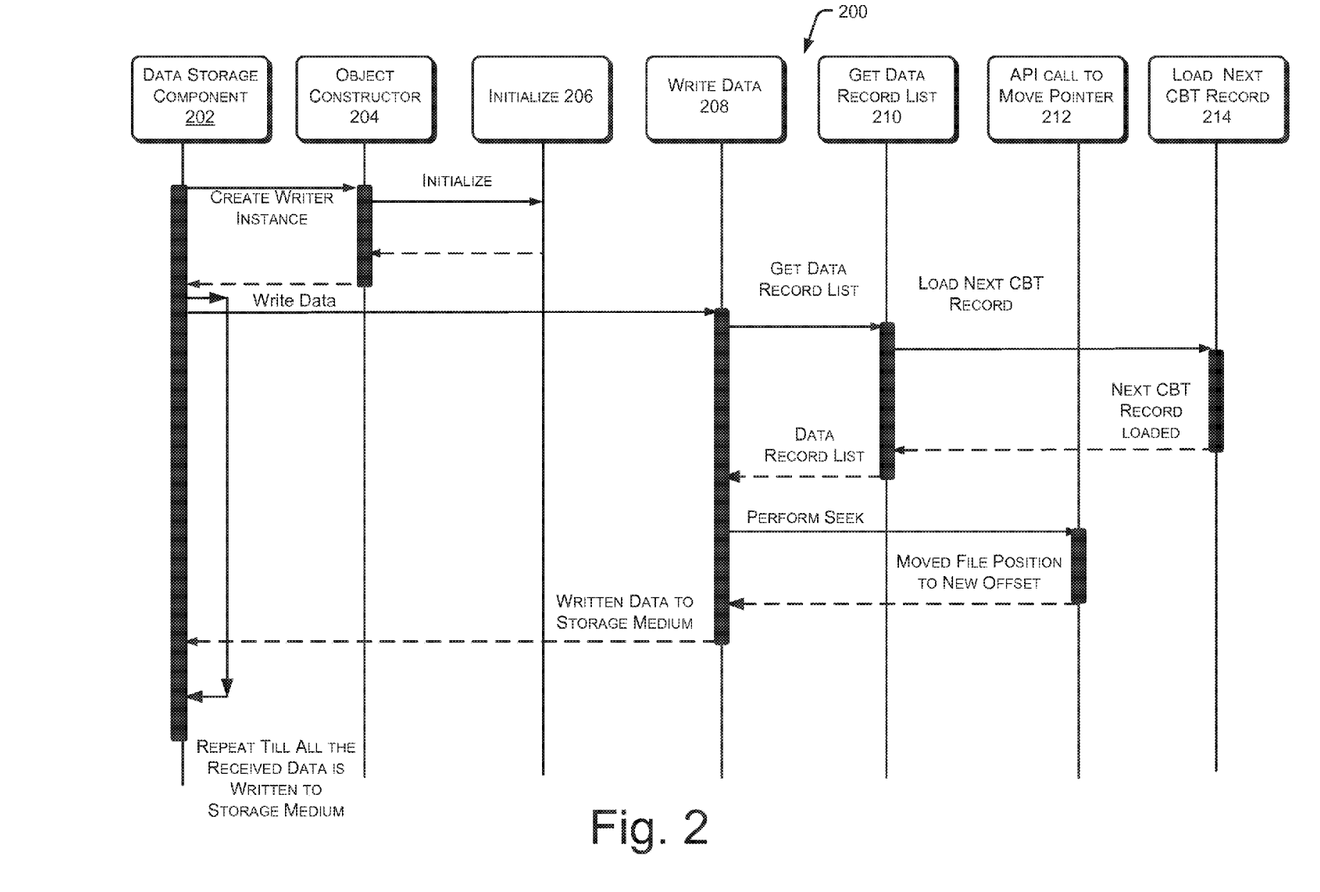
FIG. 2 illustrates a data flow for creation of thinly distributed files for virtual machine data protection, according to an example of the present subject matter.

FIG. 2 illustrates a data flow 200 for backup of virtual machine data, implemented by, for example, the DP backup agent 104, according to an example of the present subject matter.

In one implementation, on receiving a CBT map for creating backup files, a data storage component 202 initializes a data writer component (not shown) by providing a create writer instance command to an object constructor at block 204 and providing an initialize command at block 206. The data storage component 202 then provides the CBT map file to the data writer component and waits for incoming data stream. The data storage component 202 receives the metadata and actual binary data in chunks of varying sizes and forwards it to the data writer component (not shown in the fig.) at block 208. The data writer component uses the CBT map file to write the received binary data to thinly distributed files. The metadata and data can be written separately as discussed with reference to FIG. 3 below to allow for non-staged granular recovery.

For writing the data in the thinly distributed file form, the data writer component gets the byte range of the data block in which the data is to be written from the data record or data block list in the CBT map at block 210 and loads data into the data block at the load next CBT record block 214. After writing the data in a block, the data writer component determines the next block's offset byte from the CBT map. An API call, such as a performseek operation, is written as a thin distribution entry at block 212 to move the pointer or file position to the new offset byte. The data is then written till the next block is filled and so on by repeating blocks 208-214. Thus, backed-up data can be saved as thinly distributed files.

Figure 3B:
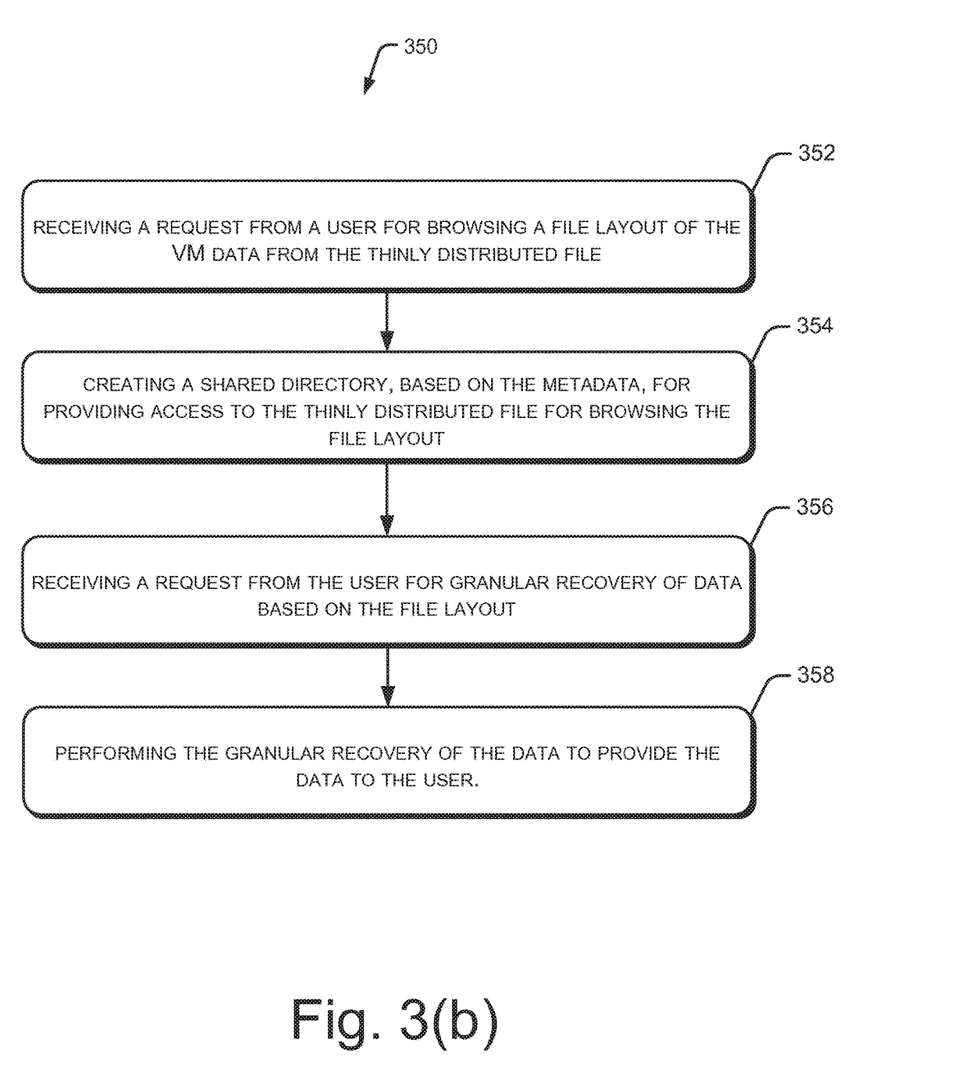
FIG. 3(b) illustrates an example method for non-staged granular recovery of backed-up virtual machine data, according to an example of the present subject matter.

FIG. 3(a) illustrates an example method 300 for taking a backup of virtual machine data for non-staged granular recovery, according to an example of the present subject matter. FIG. 3(b) illustrates an example method 350 for non-staged granular recovery of backed-up virtual machine data, according to an example of the present subject matter.

The order in which the methods 300 and 350 are described is not intended to be construed as a limitation, and any number of the described method blocks may be combined in any order to implement the methods 300 and 350, or an alternative method. Furthermore, the methods 300 and 350 may be implemented by processor(s) or computing device(s) through any suitable hardware, non-transitory machine readable instructions, or combination thereof.

It may be understood that steps of the method 300 and 350 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the methods 300 and 350 may be implemented in a variety of DP systems; in the implementations described in FIGS. 3(a) and 3(b), the methods 300 and 350 are explained in relation to the aforementioned DP system 100, for ease of explanation.

Referring to FIG. 3(a), in an example implementation of the present subject matter, at block 302, a CBT map of VM data to be backed-up in a backup session may be stored. The CBT map includes an offset byte and a byte size for each of a plurality of data blocks, the plurality of data blocks including the VM data to be backed-up from a VM disk. For example, the DP backup agent 104 may receive the CBT map from the host backup agent 138 and may process and store the CBT map in the DP database 120. The backup session may correspond to one of a full backup session and an incremental backup session, where the full backup session corresponds to a backup of those data blocks in the VM disk that have data, while the incremental backup session corresponds to the backup of those data blocks in the VM disk that changed after a previous backup session.

At block 304, a data stream comprising data and metadata corresponding to the VM data in the plurality of data blocks may be received. For example, the DP backup agent 104 may receive the data stream from the host backup agent 138.

At block 306, the data from the data stream may be stored at a first location in a storage medium as a thinly distributed file, based on the CBT map. The thinly distributed file can include a thin distribution entry between each of the plurality of data blocks to move a pointer from an end of a data block to the offset byte of a next data block. For example, the DP backup agent 104 may store the data as a thinly distributed file in the storage media 106.

Further, metadata corresponding to the data in the data stream may be stored separately at a second location in the storage media 106 and may be linked to the thinly distributed file that stores the corresponding data. The stored metadata may include metadata received in the data stream and additional metadata created, for example, by the DP backup agent 104. In another example, the additional metadata may be stored as a context file in the DP database 120. In an example, the metadata may include, but is not limited to, descriptors related to the data, references about the data, file sizes of the data, disk information corresponding to the data, and time of backup of the data.

In one implementation, the first location may either be a predefined path in the storage media 106, or may be a predefined folder in the storage media 106. Further, the storage media 106 may either be local to the DP system 100, or may be external to the DP system 100. Further, the second location may be different from the first location and may be a different path or folder than that utilized for the storage of the data at the first location.

In one example, the data in the thinly distributed file may be stored as binary copies also referred to as binary large objects (blobs) of source files, i.e., files in the VM data. Further, the blobs may be mapped to the source files so that when a user selects a source file for recovery, based on the mapping, it can be identified from which byte range of blob the data is to be recovered, and based on the CBT map, the data blocks in which the bytes corresponding to the byte range of the blob are stored can be determined. In one implementation, the stored blobs may be randomly named to avoid name conflict and to maintain integrity of the backed-up data. Further, the mapping between the blobs and the source files may also be stored in a database, such as the DP database 120, for use for granular recovery and/or restoration of data.

Referring to FIG. 3(b) and example method 350 for non-staged granular recovery of backed-up virtual machine data, at block 352 a request is received from a user for browsing the layout of files or file layout of the VM data of a backup session for granular recovery. For example, a user may select a full backup session for granular recovery and may request for mounting the VM data in the full backup session for browsing the file layout in the VM data. In another example, the user may select an incremental backup session and preceding backup sessions, such as previous incremental backup sessions up to a last full backup session, and the last full backup session for browsing the file layout. In one example, the request for browsing the file layout is received by the session manager 146 and the DP recovery agent 116.

At block 354, a shared directory may be created based on the metadata and a context file of the backup session, for providing access to the VM data for being browsed. In one example, the DP recovery agent 116 may create the shared directory, for example, through a NFS/CIFS share and may provide access to the thinly distributed file of the backup session for browsing the layout of files, for example, as a mount point.

At block 356, a request may be received from the user for granular recovery of data. For example, the user may select a file for granular recovery upon browsing the file layout and the selection may be received by the DP recovery agent 116 as a request for granular recovery.

At block 358, the DP recovery agent 116 may perform the granular recovery of the data and may provide the data to the user.

In one example, when a file is to be recovered from an incremental backup session, the byte range of the file to be recovered may be determined. Bytes corresponding to the determined byte range may be gathered from thinly distributed files of the incremental backup session and the preceding backup sessions, i.e., previous incremental backup sessions up to a last full backup session and the last full backup session. Further, the gathered bytes may be provided as the recovered file.

In one implementation, to gather the bytes corresponding to the determined byte range, the thinly distributed files may be processed in an order starting from the incremental session to the last full backup session. During the processing, a subset of the determined byte range to be retrieved from a later backup session and a remaining byte range to be retrieved from earlier backup sessions may be identified from the CBT map of the later backup session. Further the bytes in the subset of the determined byte range may be retrieved from the thinly distributed file corresponding to the later backup session. Then the earlier backup sessions may be processed similarly until the complete set of bytes corresponding to the determined byte range is retrieved.

In another example, when the file is to be recovered from full backup session, the byte range of the file to be recovered may be determined based on the metadata. The bytes corresponding to the determined byte range may be retrieved from the thinly distributed file of the full backup session and may be provided to the user as the recovered file.

Figure 4:
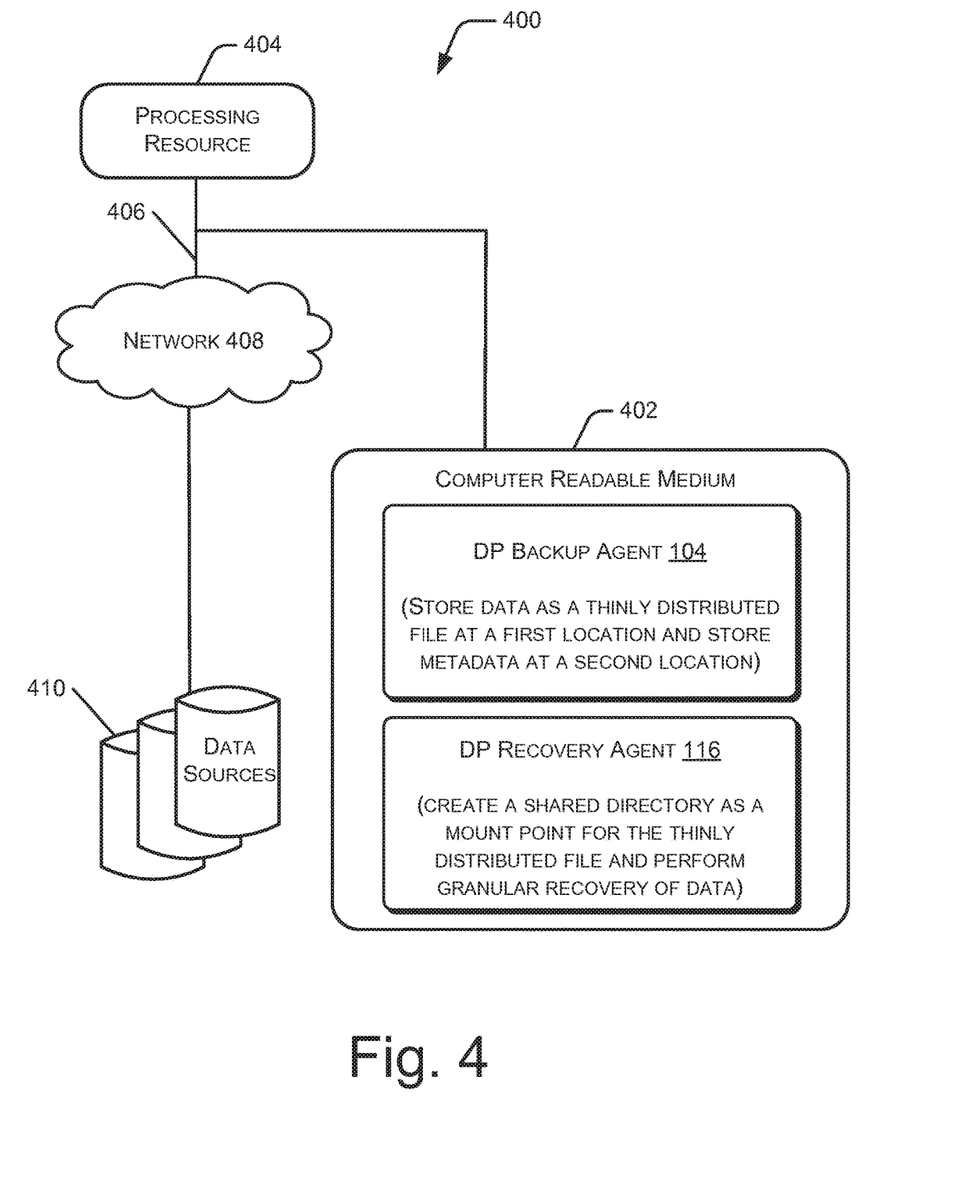
FIG. 4 illustrates an example computing environment, implementing a non-transitory computer-readable medium for virtual machine data protection, according to an example of the present subject matter.

FIG. 4 illustrates an example computing environment 400, implementing a non-transitory computer-readable medium for virtual machine data protection, according to an example of the present subject matter.

In one implementation, the non-transitory computer readable medium 402 may be utilized by a computing system, such as the DP system 100. The DP system 100 may be implemented in a public networking environment or a private networking environment In one implementation, the computing environment 400 may include a processing resource 404 communicatively coupled to the non-transitory computer readable medium 402 through a communication link 406.

For example, the processing resource 404 may be implemented in a computing system, such as the DP system 100 described earlier. The computer readable medium 402 may be, for example, an internal memory device or an external memory device. In one implementation, the communication link 406 may be a direct communication link, such as any memory read/write interface. In another implementation, the communication link 406 may be an indirect communication link, such as a network interface. In such a case, the processing resource 404 may access the computer readable medium 402 through a network 408. The network 408 may be a single network or a combination of multiple networks and may use a variety of different communication protocols.

Though not shown in the figure, the processing resource 404 and the computer readable medium 402 may also communicate with virtual machine hosts, such as the VM host 132, either directly or over the network 408. Further, the processing resource 404 and the computer readable medium 402 may also communicate with various data sources 410. The data sources 410 may include, for example, the storage media 106 and the DP database 120.

In one implementation, the computer readable medium 402 includes a set of computer readable instructions, such as instructions corresponding to the DP backup agent 104 and the DP recovery agent 116. The set of computer readable instructions may be accessed by the processing resource 404 through the communication link 406 and subsequently executed for VM data protection including backup and non-staged granular recovery.

For example, the instructions may be executable to cause the processing resource 404 to store data corresponding to a backup session of VM data at a first location in a storage medium, based on a CBT map of the VM data. The VM data may be stored as a thinly distributed file having a plurality of data blocks and a thin distribution entry between each of the plurality of data blocks. The thin distribution entry can cause a pointer to move from an end of a data block to an offset byte of a next data block. Further, metadata corresponding to the backup session of the VM data may be stored at a second location, which is different from the first location. The metadata may be linked to the thinly distributed file. Further, on receiving a request for mounting the VM data for browsing, the instructions may be executable to create a shared directory, based on the linked metadata, as a mount point to allow browsing of the VM data. Further, a user may browse the file layout in the VM data and select data for granular recovery and/or restoration.

In one implementation, when the VM data corresponds to an incremental backup session, the instructions may be executable to determine the byte range of the data to be recovered based on the metadata, gather the bytes corresponding to the determined byte range, and provide the gathered bytes as the data. In one example, the bytes may be gathered from the data blocks in thinly distributed files of the incremental backup session, previous incremental backup sessions up to a last full backup session, and the last full backup session, based on corresponding CBT map.

In another implementation, when the VM data corresponds to a full backup session, the instructions may be executable to determine the byte range of the data to be recovered based on the metadata, retrieve bytes corresponding to the determined byte range, and provide the retrieved bytes as the data. In one example, the bytes may be retrieved from the thinly distributed file of the full backup session based on corresponding CBT map.

Although implementations of systems and methods for creating CBT based backups of virtual machines and non-staged granular recovery of data from such backups have been described in language specific to structural features and/or methods, it is to be understood that the present subject matter is not necessarily limited to the specific features or methods described. Rather, the specific features and methods are disclosed and explained as example implementations of virtual machine data protection.

We claim:

1. A method for virtual machine (VM) data protection, the method comprising:
    storing a changed block tracking (CBT) map of VM data to be backed-up, wherein the CBT map includes an offset byte and a byte size for each of a plurality of data blocks, the plurality of data blocks including the VM data to be backed-up;
    receiving a data stream comprising data and metadata corresponding to the VM data in the plurality of data blocks; and
    storing the data at a first location in a storage medium as a thinly distributed file, based on the CBT map, wherein the thinly distributed file comprises a thin distribution entry between each of the plurality of data blocks to move a pointer from an end of a data block to the offset byte of a next data block.

2. The method of claim 1, wherein the VM data is backed-up in a backup session corresponding to one of a full backup session and an incremental backup session, wherein the full backup session corresponds to a backup of those data blocks in a VM disk that have data, and wherein the incremental backup session corresponds to the backup of those data blocks in the VM disk that changed after a previous backup session.

3. The method of claim 1 further comprising:
    storing the metadata at a second location in the storage medium, wherein the second location is different from the first location; and
    linking the thinly distributed file at the first location with the metadata at the second location.

4. The method of claim 1 further comprising:
    receiving a request from a user for browsing a file layout of the VM data from the thinly distributed file;

creating a shared directory, based on the metadata and a context file corresponding to the thinly distributed file, for providing access to the thinly distributed file for browsing the file layout;

receiving a request from the user for granular recovery of data based on the file layout; and performing the granular recovery of the data to provide the data to the user.

5. The method of claim 4, wherein, when the thinly distributed file corresponds to an incremental backup session, performing the granular recovery comprises:

determining, based on the metadata and the context file, the byte range of the data to be recovered;

gathering bytes corresponding to the determined byte range from thinly distributed files of the incremental backup session and preceding backup sessions, wherein the preceding backup sessions include previous incremental backup sessions up to a last full backup session and the last full backup session; and providing the gathered bytes as the data to the user.

6. The method of claim 5, wherein gathering the bytes comprises, until the bytes in the determined byte range are retrieved, identifying, from the CBT map of a later backup session, a subset of the determined byte range to be retrieved from the later backup session and a remaining byte range to be retrieved from earlier backup sessions;

retrieving, from the thinly distributed file corresponding to the later backup session, the bytes in the subset of the determined byte range; and processing the earlier backup sessions to retrieve the remaining byte range.

7. The method of claim 4, wherein, when the thinly distributed file corresponds to a full backup session, performing the granular recovery comprises:

determining the byte range of the file to be recovered based on the metadata;

retrieving bytes, corresponding to the determined byte range, from the thinly distributed file of the full backup session; and providing the retrieved bytes as the recovered file.

8. A data protection (DP) system for backup and granular recovery of virtual machine (VM) data, the DP system comprising:

a processor; and a DP backup agent coupled to the processor to:

receive a data stream comprising data and metadata corresponding to the VM data to be backed-up;

store the data at a first location in a storage medium as a thinly distributed file comprising a plurality of data blocks, wherein the thinly distributed file comprises a thin distribution entry between each of the plurality of data blocks to move a pointer from an end of a data block to an offset byte of a next data block;

store the metadata at a second location in the storage medium, wherein the second location is different from the first location; and link the thinly distributed file at the first location with the metadata at the second location.

9. The DP system of claim 8, wherein the DP backup agent is coupled to the processor to further receive a changed block tracking (CBT) map corresponding to the VM data, the CBT map including an offset byte and a byte size for each of the plurality of data blocks.

10. The DP system of claim 8, further comprising a DP recovery agent coupled to the processor to:

receive a request for browsing a file layout in the thinly distributed file of an incremental backup session;

create a shared directory, based on the metadata linked to the thinly distributed file and a context file of the incremental backup session, for providing access to thinly distributed files of the incremental backup session, previous incremental backup sessions up to a last full backup session, and the last full backup session, for browsing the file layout;

receive a request for reading data from the thinly distributed file based on the file layout;

determine the byte range of the data to be read based on the metadata and the context file;

gather the bytes, corresponding to the determined byte range, from the data blocks in the thinly distributed files of the incremental backup session, the previous incremental backup sessions up to the last full backup session, and the last full backup session, based on corresponding CBT maps and context files; and provide the gathered bytes as the data.

11. The DP system of claim 10, wherein the DP recovery agent is coupled to the processor to further initiate a filter driver to listen to requests received to read one or more thinly distributed files and filter the requests related to the thinly distributed file of the incremental backup session.

12. The DP system of claim 8 further comprising a DP recovery agent coupled to the processor to:

receive a request for browsing a file layout in the thinly distributed file of a full backup session;

create a shared directory, based on the metadata, for providing access to the thinly distributed file for browsing the file layout;

receive a request from a user for reading data from the thinly distributed file based on the file layout;

retrieve bytes, corresponding to the determined byte range, from the data blocks in the thinly distributed file of the full backup session, based on a corresponding changed block tracking (CBT map); and provide the retrieved bytes as the data.

13. A non-transitory computer-readable medium comprising instructions for virtual machine (VM) data protection, the instructions being executable by a processing resource to:

store data corresponding to a backup session of VM data at a first location in a storage medium, based on a changed block tracking (CBT) map of the VM data, wherein the data is stored as a thinly distributed file comprising a plurality of data blocks, and wherein the thinly distributed file comprises a thin distribution entry between each of a plurality of data blocks to move a pointer from an end of a data block to an offset byte of a next data block;

store metadata corresponding to the backup session of the VM data at a second location in the storage medium, wherein the second location is different from the first location, and wherein the metadata is linked to the thinly distributed file; and on receiving a request for mounting the thinly distributed file, create a shared directory, based on the linked metadata, as a mount point for the thinly distributed file.

14. The non-transitory computer-readable medium of claim 13, wherein, when the VM data corresponds to an incremental backup session, the non-transitory computer-readable medium is further executable by a processing resource to:

determine the byte range of data to be read from the thinly distributed file based on the metadata;

gather the bytes, corresponding to the determined byte range, from the data blocks in thinly distributed files of the incremental backup session, previous incremental backup sessions up to a last full backup session, and the last full backup session, based on corresponding CBT maps and context files; and provide the gathered bytes as the data.

15. The non-transitory computer-readable medium of claim 13, wherein, when the VM data corresponds to a full backup session, the non-transitory computer-readable medium is further executable by a processing resource to:

determine the byte range of data to be read from the thinly distributed file based on the metadata;

retrieve bytes, corresponding to the determined byte range, from the data blocks in the thinly distributed file of the full backup session based on a corresponding CBT map; and provide the retrieved bytes as the data.

* * * * *